United States Patent
Jin et al.

(10) Patent No.: US 10,121,302 B2
(45) Date of Patent: Nov. 6, 2018

(54) NOTE IMAGE ACQUISITION SYSTEM

(71) Applicant: GRG Banking Equipment Co., Ltd., Guangzhou, Guangdong (CN)

(72) Inventors: Xiaofeng Jin, Guangdong (CN); Tiancai Liang, Guangdong (CN); Wenchuan Gong, Guangdong (CN); Jianping Liu, Guangdong (CN)

(73) Assignee: GRG Banking Equipment Co., Ltd., Guangzhou, Guangdong (CN)

( * ) Notice: Subject to any disclaimer, the term of this patent is extended or adjusted under 35 U.S.C. 154(b) by 0 days.

(21) Appl. No.: 15/579,139

(22) PCT Filed: Mar. 25, 2016

(86) PCT No.: PCT/CN2016/077413
§ 371 (c)(1),
(2) Date: Dec. 1, 2017

(87) PCT Pub. No.: WO2016/206424
PCT Pub. Date: Dec. 29, 2016

(65) Prior Publication Data
US 2018/0174390 A1 Jun. 21, 2018

(30) Foreign Application Priority Data
Jun. 26, 2015 (CN) .......................... 2015 1 0369267

(51) Int. Cl.
G07D 7/12 (2016.01)
G07D 7/121 (2016.01)
(Continued)

(52) U.S. Cl.
CPC ........... *G07D 7/121* (2013.01); *G02B 27/283* (2013.01); *G02B 27/286* (2013.01); *G06T 7/0002* (2013.01); *G07D 7/205* (2013.01)

(58) Field of Classification Search
CPC ...... G07D 7/121; G07D 7/205; G07D 7/1205; G07D 7/12; G02B 27/286; G02B 27/283; G06T 7/0002
(Continued)

(56) References Cited

U.S. PATENT DOCUMENTS 6,449,032 B1* 9/2002 Whytock ............... G07D 7/121
356/390
2005/0110209 A1 5/2005 Mukai
(Continued)

FOREIGN PATENT DOCUMENTS

CN 1721984 A 1/2006
CN 101263422 A 9/2008
(Continued)

OTHER PUBLICATIONS

Written Opinion for Application No. PCT/CN2016/077413 dated Jul. 7, 2016.
(Continued)

*Primary Examiner* — Hina Y Ayub
*Assistant Examiner* — Amanda Merlino
(74) *Attorney, Agent, or Firm* — Wolf, Greenfield & Sacks, P.C.

(57) ABSTRACT

A note image acquiring system includes: a fiber laser, a fiber beam splitter, a fiber collimator, a laser beam expander, a lithium niobate intensity modulator array, a waveform generator, a signal amplifier, a polarization beam splitter, a quarter-wave plate, an imaging lens group, a line-array photosensitive chip, an image information processing module and an image combining module. The note image acquiring system can improve resolution of details of a note image without needing to increase the number of photosensitive chip units per unit length of a linear array image sensor.

18 Claims, 2 Drawing Sheets

(51) Int. Cl.
*G02B 27/28* (2006.01)
*G06T 7/00* (2017.01)
*G07D 7/202* (2016.01)

(58) Field of Classification Search
USPC .......................................................... 356/71
See application file for complete search history.

(56) References Cited

U.S. PATENT DOCUMENTS

| | | |
|---|---|---|
| 2006/0013593 A1 | 1/2006 | Yokoo et al. |
| 2006/0244973 A1 | 11/2006 | Yun et al. |
| 2008/0273123 A1 | 11/2008 | Morikawa et al. |
| 2011/0168776 A1 | 7/2011 | Jalali et al. |
| 2013/0002968 A1 | 1/2013 | Bridge et al. |
| 2013/0194573 A1 | 8/2013 | Ohba et al. |
| 2014/0285812 A1 | 9/2014 | Levitz |

FOREIGN PATENT DOCUMENTS

| | | |
|---|---|---|
| CN | 101441272 A | 5/2009 |
| CN | 201812046 U | 4/2011 |
| CN | 102087503 A | 6/2011 |
| CN | 102239494 A | 11/2011 |
| CN | 103021069 A | 4/2013 |
| CN | 202931446 U | 5/2013 |
| CN | 103221803 A | 7/2013 |
| CN | 103293126 A | 9/2013 |
| CN | 103344569 A | 10/2013 |
| CN | 103777206 A | 5/2014 |
| CN | 104102017 A | 10/2014 |
| CN | 204044916 U | 12/2014 |
| CN | 104464076 A | 3/2015 |
| CN | 104535171 A | 4/2015 |
| CN | 105096445 A | 11/2015 |
| JP | 2006-338325 A | 12/2006 |
| JP | 2014-170313 A | 9/2014 |
| WO | WO 2004/023402 A1 | 3/2004 |

OTHER PUBLICATIONS

International Search Report for International Application No. PCT/CN2016/077413 dated Jul. 7, 2016.
Extended European Search Report dated Jun. 7, 2018 in connection with Application No. 16813540.8.

* cited by examiner

NOTE IMAGE ACQUISITION SYSTEM

The present application is the national phase of International Patent Application No. PCT/CN2016/077413 filed on Mar. 25, 2016, which claims priority to Chinese Patent Application No. 201510369267.2, titled "NOTE IMAGE ACQUISITION SYSTEM", filed on Jun. 26, 2015 with the State Intellectual Property Office of the People's Republic of China, both of which applications are incorporated herein by reference in their entireties.

FIELD

The present application relates to the technical field of finance, and particularly to a note image acquiring system.

BACKGROUND

Since China is a country with a large population, the amount of cash in circulation is huge. According to statistical data from the People's Bank of China, a total amount of currencies in circulation in China has reached 6.7 trillion RMB by the first quarter of 2014. According to incomplete statistics, various kinds of counterfeit Renminbi in circulation in the current market reach up to ten billion Yuan. Since 2009, polices of China have uncovered more than 6500 cases of counterfeit currencies, destroyed 39 large hideouts of counterfeit currencies and seized counterfeit currencies of more than 2.5 billion Yuan. In order to strongly fight against the counterfeit currencies, a lot of anti-counterfeiting technologies are adopted to the new edition of Renminbi banknote. Commonly used anti-counterfeiting technologies include a miniature text printing, a metal line, a color changing ink, an invisible image, or other characteristics. However, with development of manufacturing process of counterfeit currency, a counterfeit currency is closer and closer to a real currency, which raises a requirement of extracting more detailed characteristic information from a note image to verify the authenticity of the banknote.

In order to achieve a high-resolution analysis of a note image detail such as a miniature text, the number of photosensitive chip units per unit length of a line-array array image sensor is generally increased in a conventional image acquiring system. By adopting the above method to acquire more detailed characteristic information of the note image, the difficulty of manufacturing the photosensitive chip is increased. Furthermore, at a certain clock frequency, the increased number of the photosensitive chip units affects a transmitting speed of image data, resulting in a lowered speed of detecting a currency by financial self-service equipment.

SUMMARY

An embodiment of the present disclosure provides a note image acquiring system to solve the problem in the conventional image acquiring system that the number of photosensitive chip units per unit length of a line-array array image sensor has to be increased to improve a resolution of a note image.

The note image acquiring system provided by the embodiment of the present disclosure includes: a fiber laser, a fiber beam splitter, a fiber collimator, a laser beam expander, a lithium niobate intensity modulator array, a waveform generator, a signal amplifier, a polarization beam splitter, a quarter-wave plate, an imaging lens group, a line-array photosensitive chip, an image information processing module and an image combining module.

The fiber laser, the fiber beam splitter, the fiber collimator and the laser beam expander are sequentially aligned to build an irradiating light path.

A distal end of the irradiating light path falls onto an optical signal receiving end of the lithium niobate intensity modulator array.

An optical signal sending end of the lithium niobate intensity modulator array, the polarization beam splitter and the quarter-wave plate are sequentially aligned to build a modulating light path. A distal end of the modulating light path falls onto a to-be-detected note.

The to-be-detected note, the quarter-wave plate and the polarization beam splitter are sequentially aligned to build a reflecting light path. The reflecting light path is sent by the polarization beam splitter into the imaging lens group.

The reflecting light path falls onto an optical signal receiving end of the line-array photosensitive chip via the imaging lens group.

The waveform generator is connected to the signal amplifier. The signal amplifier is connected to the lithium niobate intensity modulator array.

The image information processing module is connected to the line-array photosensitive chip, the image combining module and the waveform generator respectively to obtain a driving signal generated by the waveform generator and an electrical signal acquired by the line-array photosensitive chip, and to rebuild a preliminary image of the to-be-detected note based on the driving signal and the electrical signal.

The image combining module is configured to combine multiple said preliminary images to obtain a high resolution image of the to-be-detected note.

Optionally, the fiber laser, the fiber beam splitter and the fiber collimator are connected via optical fibers to build a light path.

Optionally, the fiber laser is a wavelength-tunable fiber laser. A laser generated by the fiber laser includes a red light, a green light and a blue light.

Optionally, a wavelength of the red light is 700 nm, a wavelength of the green light is 546 nm and a wavelength of the blue light is 436 nm.

Optionally, the fiber beam splitter is a 1*N fiber beam splitter configured to evenly divide a laser beam generated by the fiber laser into N parts.

The fiber collimator is a 1×N fiber collimator configured to transmit the evenly divided N parts of the laser beam to the laser beam expander.

The laser beam expander is a 1×N laser beam expander configured to perform spatial expansion on the N parts of the laser beam.

Optionally, the waveform generator is configured to generate the driving signal and send the driving signal to the signal amplifier.

The signal amplifier is configured to convert the driving signal into a voltage signal.

The lithium niobate intensity modulator array is configured to perform two dimensional spatial modulation on a received laser signal based on the voltage signal.

Optionally, after passing through the irradiating light path, the modulating light path and the reflecting light path sequentially, a laser signal is received by the optical signal receiving end of the line-array photosensitive chip.

The line-array photosensitive chip is configured to convert the laser signal into the electrical signal.

Optionally, the fiber laser is configured to generate a vertically polarized laser signal.

Optionally, the preliminary image corresponds to the laser signal corresponding to the electrical signal, and includes a red light acquired image corresponding to the red light, a green light acquired image corresponding to the green light and a blue light acquired image corresponding to the blue light.

The image combining module is configured to combine the red light acquired image, the green light acquired image and the blue light acquired image at a rate of 1:1:1 to generate the high resolution image of the to-be-detected note.

Optionally, a piece of transparent protective glass is arranged between the quarter-wave plate and the to-be-detected note.

In view of the above technical solutions, the embodiment of the present disclosure has the following advantages.

In the embodiment of the present disclosure, the note image acquiring system may perform a high resolution analysis on detailed characteristics of a note image such as a miniature text without increasing the number of photosensitive chips per unit length, which does not increase a difficulty of a manufacturing process of the photosensitive chip and does not make an effect on a transmitting speed of image data while ensures an currency detection accuracy of a financial self-service device.

DETAILED DESCRIPTION OF EMBODIMENTS

Figure 1:
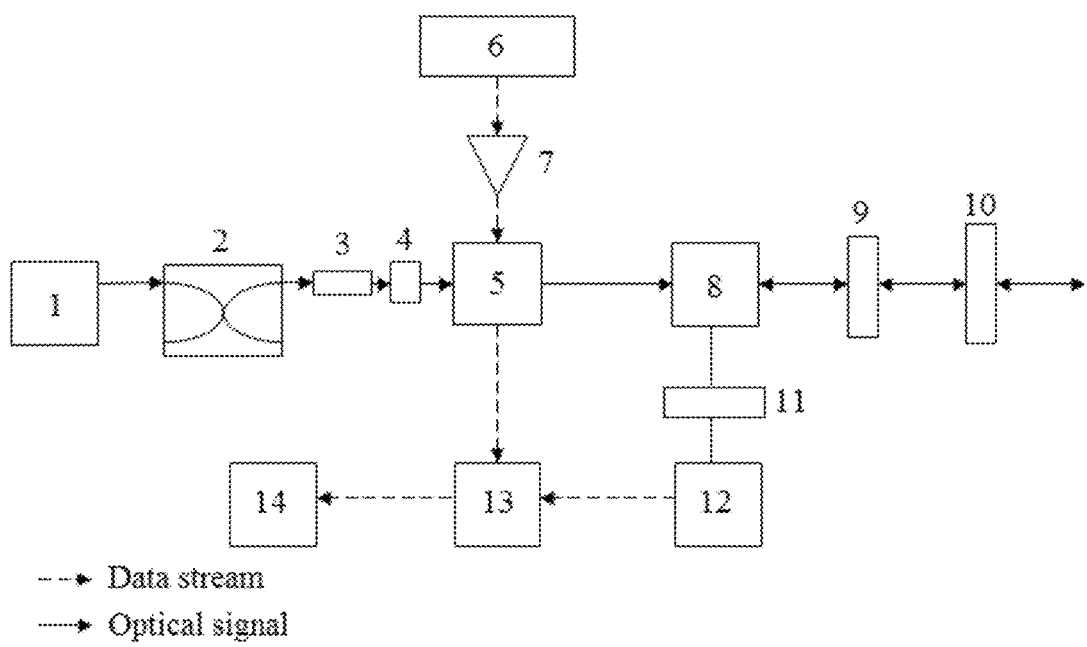
FIG. 1 is a schematic structural diagram of a note image acquiring system according to an embodiment of the present disclosure.

An embodiment of the present disclosure provides a note image acquiring system to solve the problem in the conventional image acquiring system that the number of photosensitive chip units per unit length of a line-array array image sensor has to be increased to improve a resolution of a note image.

In order to make the objective, characteristics and advantages of the present disclosure more clear and easy to understand, hereinafter the technical solutions of the embodiments of the present disclosure are described clearly and completely in conjunction with drawings in the embodiments of the present disclosure. Apparently, the described embodiments are only part of the embodiments of the present disclosure, rather than all the embodiments. Based on the embodiments of the present disclosure, all other embodiments obtained by those skilled in the art without any creative work fall within the protective scope of the present disclosure.

A note image acquiring system provided according to an embodiment of the present disclosure includes: a fiber laser, a fiber beam splitter, a fiber collimator, a laser beam expander, a lithium niobate intensity modulator array, a waveform generator, a signal amplifier, a polarization beam splitter, a quarter-wave plate, an imaging lens group, a line-array photosensitive chip, an image information processing module and an image combining module.

The fiber laser, the fiber beam splitter, the fiber collimator and the laser beam expander are sequentially aligned to build an irradiating light path.

A distal end of the irradiating light path falls onto an optical signal receiving end of the lithium niobate intensity modulator array.

An optical signal sending end of the lithium niobate intensity modulator array, the polarization beam splitter and the quarter-wave plate are sequentially aligned to build a modulating light path. A distal end of the modulating light path falls onto a to-be-detected note.

The to-be-detected note, the quarter-wave plate and the polarization beam splitter are sequentially aligned to build a reflecting light path. The reflecting light path is sent by the polarization beam splitter into the imaging lens group.

The reflecting light path falls onto an optical signal receiving end of the line-array photosensitive chip via the imaging lens group.

The waveform generator is connected to the signal amplifier. The signal amplifier is connected to the lithium niobate intensity modulator array.

The image information processing module is connected to the line-array photosensitive chip, the image combining module and the waveform generator, and is configured to obtain a driving signal generated by the waveform generator and an electrical signal acquired by the line-array photosensitive chip, and rebuild a preliminary image of the to-be-detected note based on the driving signal and the electrical signal.

The image combining module is configured to combine multiple said preliminary images to obtain a high resolution image of the to-be-detected note.

Preferably, the fiber laser, the fiber beam splitter and the fiber collimator are connected via optical fibers to build a light path.

Preferably, the fiber laser is a wavelength-tunable fiber laser. A laser generated by the fiber laser includes a red light, a green light and a blue light. Most preferably, a wavelength of the red light is 700 nm, a wavelength of the green light is 546 nm and a wavelength of the blue light is 436 nm.

Preferably, the fiber beam splitter is a 1×N fiber beam splitter configured to evenly divide a laser beam generated by the fiber laser into N parts. The fiber collimator is a 1×N fiber collimator configured to transmit the evenly divided N parts of the laser beam to the laser beam expander. The laser beam expander is a 1×N laser beam expander configured to perform spatial expansion on the N parts of the laser beam. It can be understood that, the fiber laser generates a laser beam, which is evenly divided into N parts by the optical beam splitter. The N parts of the laser beam are expanded into a space via the 1×N optical collimator and the 1×N laser beam expander. This is because an irradiating area of a laser beam generated by the fiber laser is small while a surface of the to-be-detected note is large. In order to cover the whole surface of the to-be-detected note by the laser beam, the laser beam must be divided and expanded.

Preferably, the waveform generator is configured to generate the driving signal and send the driving signal to the signal amplifier.

The signal amplifier is configured to convert the driving signal into a voltage signal.

The lithium niobate intensity modulator array is configured to perform two dimensional spatial modulation on a received laser signal based on the voltage signal.

Preferably, after passing through the irradiating light path, the modulating light path and the reflecting light path sequentially, a laser signal is received by the optical signal receiving end of the line-array photosensitive chip.

The line-array photosensitive chip is configured to convert the laser signal into the electrical signal.

Preferably, the fiber laser is configured to generate a vertically polarized laser signal.

Preferably, the preliminary image corresponds to the laser signal corresponding to the electrical signal, and includes a red light acquired image corresponding to the red light, a green light acquired image corresponding to the green light and a blue light acquired image corresponding to the blue light.

The image combining module is configured to combine the red light acquired image, the green light acquired image and the blue light acquired image at a rate of 1:1:1 to generate the high resolution image of the to-be-detected note.

Preferably, a piece of transparent protective glass is arranged between the quarter-wave plate and the to-be-detected note.

For better understanding, hereinafter a real application scenario is taken to specifically describe a note image acquiring system according to an embodiment of the present disclosure. References are made to FIG. 1 and FIG. 2.

Figure 2:
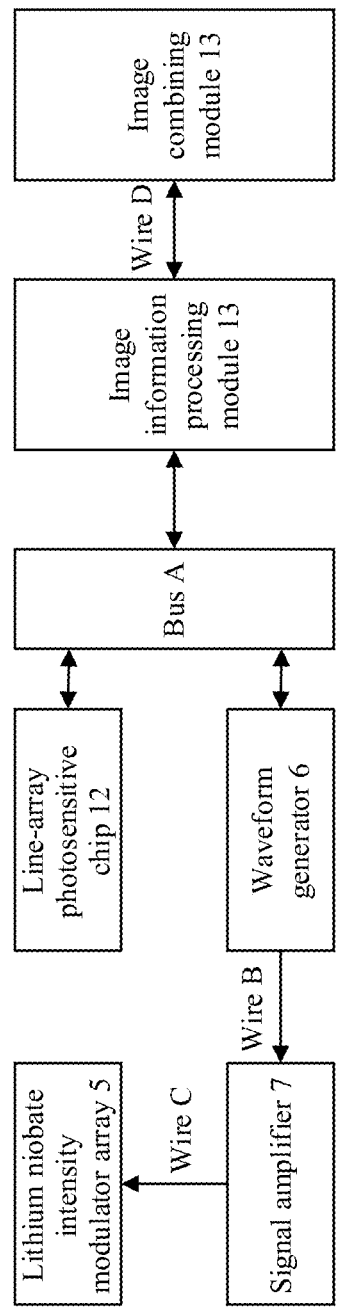
FIG. 2 is a schematic diagram showing a connecting relationship between an image information processing module, an image combining module, a line-array photosensitive chip, a waveform generator, a signal amplifier and a lithium niobate intensity modulator array according to an embodiment of the present disclosure.

Firstly, it should be noted that, in FIG. 1, a solid arrow indicates an optical signal and a transmitting direction of the optical signal, a dotted arrow indicates a data stream. FIG. 2 shows a connecting relationship between an image information processing module, an image combining module, a line-array photosensitive chip, a waveform generator, a signal amplifier and a lithium niobate intensity modulator array.

The note image acquiring system includes a wavelength-tunable fiber laser 1, a 1×N fiber beam splitter 2, a 1×N fiber collimator 3, a 1×N laser beam expander 4, a lithium niobate intensity modulator array 5, a waveform generator 6, a signal amplifier 7, a polarization beam splitter 8, a quarter-wave plate 9, transparent protective glass 10, an imaging lens group 11, a line-array photosensitive chip 12, an image information processing module 13, and an image combining module 14.

The wavelength-tunable fiber laser 1 is configured to generate lasers with different wavelengths including a red light having a wavelength of 700 nm, a green light having a wavelength of 546 nm and a blue light having a wavelength of 436 nm.

The 1×N fiber beam splitter 2 is configured to evenly divide a laser beam generated by the fiber laser 1 into N parts.

The 1×N fiber collimator 3 is configured to transmit the evenly divided N parts of the laser beam from an optical fiber to the space.

The 1×N laser beam expander 4 is configured to perform spatial expansion on the N parts of the laser beam.

The waveform generator 6 is connected to the signal amplifier 7 via a wire B, and connected to the image information processing module 13 via a bus A. The waveform generator 6 is configured to generate a driving signal.

The signal amplifier 7 is connected to the waveform generator 6 via the wire B, and connected to the lithium niobate intensity modulator array 5 via a wire C. The signal amplifier 7 is configured to perform a conversion from the driving signal generated by the waveform generator 6 to a voltage signal.

The lithium niobate intensity modulator array 5 is connected to the signal amplifier 7 via the wire C and configured to perform two-dimensional spatial modulation on the laser signal based on the voltage signal generated by the signal amplifier 7. It should be understood that there are N lithium niobate intensity modulators arranged on the lithium niobate intensity modulator array 5, which correspond to the N parts of the laser beam respectively.

The polarization beam splitter 8 is configured to horizontally polarize or vertically polarize the parts of the laser beam.

The quarter-wave plate 9 is configured to modulate the laser signal in a horizontally polarized state or a vertically polarized state.

The transparent protective glass 10 is configured to maintain cleanness of components in the system.

The imaging lens group 11 is configured to focus a signal returned by a banknote onto the line-array photosensitive chip 12.

The line-array photosensitive chip 12 is connected to the image information processing module 13 via the bus A, and is configured to receive an optical signal returned by the banknote and convert the optical signal into an electrical signal.

The image information processing module 13 is connected to the line-array photosensitive chip 12 via the bus A, connected to the waveform generator 6 via the wire A, and connected to an image combining module 14 via a wire D. The image information processing module 13 is configured to rebuild a high resolution color image of the note by a compressive sensing algorithm based on a modulated signal from the lithium niobate intensity modulator array 5 and the electrical signal from the line-array photosensitive chip 12.

The image combining module 14 is connected to the image information processing module 13 via the wire D and is configured to combine a red light acquired image, a green light acquired image and a blue light acquired image at a rate of 1:1:1 to generate a color image.

A working process of the note image acquiring system of the present disclosure is described as follows.

The fiber laser 1 generates a vertically polarized laser signal S0 having a central wavelength of 700 nm as a red light and transmits it to the 1×N fiber beam splitter 2 via an optical fiber. The 1×N fiber beam splitter 2 evenly divides the laser signal S0 into N parts. Each part of the laser signal is denoted as S1.

The 1×N fiber collimator 3 transmits the laser signal S1 to the space via the optical fiber to reach the 1×N laser beam expander 4. The 1×N laser beam expander 4 performs the beam expansion on each laser signal S1 of the laser signal S0 to generate a facula having a diameter d. The expanded laser signal is denoted as S2. The laser signal S2 is vertically emitted to the lithium niobate intensity modulator array 5 without a loaded voltage.

The waveform generator 6 generates a two dimensional random matrix U1 by taking 0 and 1 as elements. The waveform generator 6 transmits the two dimensional random matrix U1 to the signal amplifier 7. The waveform generator 6 transmits the two dimensional random matrix U1 to the image information processing module 13.

The signal amplifier 7 converts the inputted two dimensional random matrix U1 into a voltage modulating matrix E1. The signal amplifier 7 transmits the voltage modulating matrix E1 to the lithium niobate intensity modulator array 5. The lithium niobate intensity modulator array 5 performs a two dimensional intensity coding modulation on the laser signal S2 based on the inputted voltage modulating matrix E1 to obtain the modulated laser signal S3.

The vertically polarized laser signal S3 containing modulating information is emitted to the to-be-detected note via the polarization beam splitter 8, the quarter-wave plate 9 and the transparent protective glass 10. The signal S3 is reflected as a signal S4 by the to-be-detected note. After the signal S4 passes through the quarter-wave plate 9, since the vertically polarized laser signal passes through the quarter-wave plate 9 twice, the polarization state is changed from a vertical polarization state to a horizontal polarization state.

The polarization beam splitter 8 reflects the horizontally polarized signal S4 downward to the line-array photosensitive chip 12 via the imaging lens group 11. The line-array photosensitive chip 12 unit records an intensity signal value P of the signal S4 returned by the note and uploads it to the image information processing module 13.

The image information processing module 13 adjusts a two-dimensional random matrix Ui generated by the waveform generator 6 and performs K measurements. The image information processing module 13 obtains K groups of the two-dimensional modulating matrix Ui and the intensity signal value Pi, i=1 . . . , K, to obtain a modulating sequence {U1, . . . , Ui, . . . , UK} composed of the two-dimensional random matrixes. Data acquired by the line-array photosensitive chip 12 is a signal sequence {P1, . . . , Pi, . . . , PK} composed of the one-dimensional signal data, i=1, 2, 3, . . . , K.

For the modulating sequence {U1, . . . , Ui, . . . , UK}, a row number and a column number of each two-dimensional modulating matrix are denoted as T1 and T2 respectively. Then a total pixel number is T=T1×T2. The image information processing module 13 uses a matrix A to represent a modulating sequence. Each two-dimensional modulating matrix image composes a row of the matrix A. Then the matrix A has K rows and T columns.

The number of the line-array laser sources and the number of the line-array photosensitive chips are both N. For the signal sequence {P1, . . . , Pi, . . . , PK}, each one-dimensional signal S contains N elements. The image processing module 13 uses a matrix Y to represents the signal sequence. Each one-dimensional signal composes a row of the matrix Y. Then the matrix Y is a matrix with K rows and N columns.

The line-array laser source and the line-array photosensitive chip unit divide a column of the note image into N blocks. The modulating sequence subdivides each divided block of the note image into T1 rows and T2 columns. That is a matrix of the note image is {H1, . . . , Hi, . . . , HK}. The image processing module 13 uses a matrix R to represent the note image. Each block of the image matrix composes a row of the R. Then the matrix R has T rows and N columns. Then the following equation can be obtained:

Y=AR, which is a mathematical relationship between the note image R, the modulating sequence A and the data Y acquired by the line-array photosensitive chip.

A compressive sensing algorithm is adopted in the image information processing module 13 to perform a non-linear rebuilding process on the equation group established based on the modulating sequence A, the data Y acquired by the line-array photosensitive chip and the note image matrix R, to obtain a high resolution image data R of the note corresponding to the red light having a wavelength of 700 nm. By the compressive sensing algorithm taking advantage of a sparse characteristic of the signal, under the condition that a sampling rate is far less than the Nyquist sampling rate, a random sampling is adopted to obtain a discrete sample of a signal and then the signal is perfectly rebuilt by the non-linear rebuilding algorithm. A specific process is described as follows. Each block R1 of the note image matrix may be solved by the following process based on the compressive sensing algorithm.

Reference is made to the mathematical relationship between the note image R, the modulating sequence A and the data Y acquired by the line-array photosensitive chip:

Y=AR.

A first image data block $R_1$ is a column vector with T rows. A signal data matrix $Y_1$ is a column vector with K rows. The modulating matrix A has K rows and T columns. A sparse matrix $\Psi$ is a T×T matrix. The problem to rebuild the image data $R_1$ is described as that, with a known signal data matrix $Y_1$, and the given modulating matrix A and sparse matrix $\Psi$, how to solve estimated image data $\hat{R}_1$. The solution of this problem may be obtained by solving the following formula:

$$\alpha_* = \underset{\alpha}{\mathrm{argmin}}\left\{\frac{1}{2}\|Y_1 - A\Psi\alpha\|_2^2 + \tau\|\alpha\|_0\right\}$$

$$\hat{R}_1 = \Psi \cdot \alpha_*$$

where, $\alpha$ is a sparse expression coefficient.

The present disclosure may adopt a matching pursuit (MP) algorithm to calculate $\alpha_*$ in the above formula. A specific process is as follows.

1. An initial value $\alpha=0$ and an initial residual error $r=Y$ are set.
2. A maximum matching dictionary item $$i_* = \arg\underset{i=1,\ldots,N}{\min}\{d_i^T r\}$$

is calculated, where $d_i$ is the i-th column of the matrix.

3. the coefficient and the residual error are updated as:

$$\alpha[i_*]=\alpha[i_*]+d_{i_*}^T r$$

$$r=r-(d_{i_*}^T r)d_{i_*}$$

4. $\|\alpha\|_0$ is calculated. If $\|\alpha\|_0$ is greater than 0.2K, then the process goes to step 2.

If $\|\alpha\|_0$ is not greater than 0.2K, $\alpha$ is output as the optimal solution $\alpha_*$.

After $\alpha_*$ is calculated, $\hat{R}_1=\Psi\cdot\alpha$ is calculated to obtain the image data estimation $\hat{R}_1$. Since the modulating matrix A is used to perform the two dimensional modulation on an imaging field of each photosensitive chip, the high resolution image of the note can be obtained.

The image information processing module 13 repeats the above process, to obtain image data estimations $\hat{R}2 \ldots \hat{R}_N$. The image information processing module 13 combines the obtained image data estimations according to their order to form a high resolution image R of the note. The image information processing module 13 uploads the obtained high resolution image R of the note corresponding to the red light having a wavelength of 700 nm to the image combining module 14.

The fiber laser 1 adjusts the wavelength of emitted laser and generates a vertically polarized laser signal SG0 with a central wavelength of 700 nm as red light. The above process is repeated to obtain, by the image information processing module 13, a high resolution image G of the note corresponding to a green light having a wavelength of 546 nm. The fiber laser 1 adjusts the wavelength of emitted laser and generates a vertically polarized laser signal SB0 with a central wavelength of 700 nm as red light. The above process is repeated to obtain a high resolution image B of the note corresponding to a blue light having a wavelength of 436 nm.

The image combining module 14 combines the high resolution acquired image R of the note corresponding to the red light, the high resolution acquired image G of the note corresponding to the green light and the high resolution acquired image B of the note corresponding to the blue light at a rate of 1:1:1 to obtain a high resolution color image of the note.

The note image acquiring system of the present disclosure has the following advantages. The system can achieve a high resolution analysis of detailed characteristics of a note image, such as a miniature text, without increasing the number of photosensitive chips per unit length, and also has advantages of fast calculating speed, low cost, low power consumption and fast transmitting rate. Furthermore, a laser is adopted as a light source which has advantages of good monochromaticity and intensive brightness, effectively overcoming the color cast influence on the note image acquisition caused by a wide spectrum of a LED light source.

Those skilled in the art may clearly understand that, in order to describe conveniently and concisely, specific operations of the above described system, apparatus and the units are not described herein, and one may refer to the process corresponding to the above method embodiment.

In the embodiments provided by the present disclosure, it should be understood that, the system, the apparatus and the method may be implemented in other ways. For example, the above described apparatus embodiment is only illustrative. For example, a division of the units is merely a logic functional division. In a real implementation, there may be other division method. For example, multiple units or components may be combined or integrated to another system, or some characteristics may be ignored or not executed. For another example, a mutual coupling or a direct coupling or communicative connection displayed or discussed here may be an indirect coupling or communicative connection via some interfaces, apparatuses or units, which may be electrical, mechanical or in other forms.

The above units described as discrete components may be or may not be physically separated. The components displayed as units may be or may not be physical units. That is they may be located at the same place or may be distributed to multiple network units. Part of or all of units may be selected as required to implement the objective of the solution of the embodiment.

Besides, the functional units in the embodiments of the present disclosure may be integrated in a same processing unit or may exist as separate physical units, or two or more units may be integrated in a processing unit. The above integrated units may be implemented as hardware or as software function units.

If the integrated units are implemented as the software function units and are sold or used as a single product, they may be stored in a computer readable storage medium. Based on this understanding, the essence of the technical solution of the present disclosure or the part having a contribution to the conventional technology, or all or part of the technical solution may be embodied as a software product. The computer software product is stored in a storage medium, including multiple instructions to make a computer device (which may be a personal computer, a server or a network device and the like) execute all or part of the steps of the method of each embodiment of the present disclosure. The above storage medium includes a USB, a portable hard disk, a read-only memory (ROM), a random access memory (RAM), a disk or a CD and other medium that can store a program code.

In summary, the above embodiments are only used to illustrate the technical solutions of the present disclosure while not intended to be limit. Although the present disclosure is specifically described with reference to the above embodiments, those skilled in the art can understand that they may make amendments to the technical solutions described in the above embodiments or equivalent substitutions for part of technical features. All the amendments or substitutions do not make a corresponding technical solution depart from the spirit or scope of the embodiments of the present disclosure.

The invention claimed is:

1. A note image acquiring system, comprises:
a fiber laser,
a fiber beam splitter,
a fiber collimator,
a laser beam expander,
a lithium niobate intensity modulator array,
a waveform generator,
a signal amplifier,
a polarization beam splitter,
a quarter-wave plate,
an imaging lens group,
a line-array photosensitive chip,
an image information processing module, and
an image combining module, wherein
the fiber laser, the fiber beam splitter, the fiber collimator and the laser beam expander are sequentially aligned to build an irradiating light path;
a distal end of the irradiating light path falls onto an optical signal receiving end of the lithium niobate intensity modulator array;
an optical signal sending end of the lithium niobate intensity modulator array, the polarization beam splitter and the quarter-wave plate are sequentially aligned to build a modulating light path, a distal end of the modulating light path falls onto a to-be-detected note;
the to-be-detected note, the quarter-wave plate and the polarization beam splitter are sequentially aligned to build a reflecting light path, the reflecting light path is sent by the polarization beam splitter into the imaging lens group;
the reflecting light path falls onto an optical signal receiving end of the line-array photosensitive chip via the imaging lens group;
the waveform generator is connected to the signal amplifier, the signal amplifier is connected to the lithium niobate intensity modulator array;
the image information processing module is connected to the line-array photosensitive chip, the image combining module and the waveform generator, and is configured to obtain a driving signal generated by the waveform generator and an electrical signal acquired by the line-array photosensitive chip, and rebuild a preliminary image of the to-be-detected note based on the driving signal and the electrical signal; and the image combining module is configured to combine a plurality of the preliminary images to obtain a high resolution image of the to-be-detected note.

2. The note image acquiring system according to claim 1, wherein the fiber laser, the fiber beam splitter and the fiber collimator are connected via optical fibers to build a light path.

3. The note image acquiring system according to claim 1, wherein the fiber laser is a wavelength-tunable fiber laser, and a laser generated by the fiber laser comprises a red light, a green light and a blue light.

4. The note image acquiring system according to claim 3, wherein a wavelength of the red light is 700 nm, a wavelength of the green light is 546 nm, and a wavelength of the blue light is 436 nm.

5. The note image acquiring system according to claim 1, wherein the fiber beam splitter is a 1×N fiber beam splitter configured to evenly divide a laser beam generated by the fiber laser into N parts;
   the fiber collimator is a 1×N fiber collimator configured to transmit the evenly divided N parts of the laser beam to the laser beam expander; and
   the laser beam expander is a 1×N laser beam expander configured to perform spatial expansion on the N parts of the laser beam.

6. The note image acquiring system according to claim 1, wherein
   the waveform generator is configured to generate the driving signal and send the driving signal to the signal amplifier;
   the signal amplifier is configured to convert the driving signal into a voltage signal; and
   the lithium niobate intensity modulator array is configured to perform two dimensional spatial modulation on a received laser signal based on the voltage signal.

7. The note image acquiring system according to claim 1, wherein
   after passing through the irradiating light path, the modulating light path and the reflecting light path sequentially, a laser signal is received by the optical signal receiving end of the line-array photosensitive chip; and
   the line-array photosensitive chip is configured to convert the laser signal into the electrical signal.

8. The note image acquiring system according to claim 1, wherein the fiber laser is configured to generate a vertically polarized laser signal.

9. The note image acquiring system according to claim 3, wherein
   the preliminary image corresponds to the laser signal corresponding to the electrical signal, and comprises a red light acquired image corresponding to the red light, a green light acquired image corresponding to the green light and a blue light acquired image corresponding to the blue light; and
   the image combining module is configured to combine the red light acquired image, the green light acquired image and the blue light acquired image at a rate of 1:1:1 to generate the high resolution image of the to-be-detected note.

10. The note image acquiring system according to claim 1, wherein a piece of transparent protective glass is arranged between the quarter-wave plate and the to-be-detected note.

11. The note image acquiring system according to claim 2, wherein a piece of transparent protective glass is arranged between the quarter-wave plate and the to-be-detected note.

12. The note image acquiring system according to claim 3, wherein a piece of transparent protective glass is arranged between the quarter-wave plate and the to-be-detected note.

13. The note image acquiring system according to claim 4, wherein a piece of transparent protective glass is arranged between the quarter-wave plate and the to-be-detected note.

14. The note image acquiring system according to claim 5, wherein a piece of transparent protective glass is arranged between the quarter-wave plate and the to-be-detected note.

15. The note image acquiring system according to claim 6, wherein a piece of transparent protective glass is arranged between the quarter-wave plate and the to-be-detected note.

16. The note image acquiring system according to claim 7, wherein a piece of transparent protective glass is arranged between the quarter-wave plate and the to-be-detected note.

17. The note image acquiring system according to claim 8, wherein a piece of transparent protective glass is arranged between the quarter-wave plate and the to-be-detected note.

18. The note image acquiring system according to claim 9, wherein a piece of transparent protective glass is arranged between the quarter-wave plate and the to-be-detected note.

* * * * *